United States Patent [19]

Kisovec

[11] 4,355,955
[45] Oct. 26, 1982

[54] WIND TURBINE ROTOR SPEED CONTROL SYSTEM

[75] Inventor: Adrian V. Kisovec, Munich, Fed. Rep. of Germany

[73] Assignee: The Boeing Company, Seattle, Wash.

[21] Appl. No.: 251,292

[22] Filed: Apr. 6, 1981

[51] Int. Cl.³ .............................................. F03D 7/04
[52] U.S. Cl. .................................. 416/23; 416/132 B; 416/37
[58] Field of Search .................. 416/53, 41, 23, 132 B, 416/37

[56] References Cited

U.S. PATENT DOCUMENTS

| Re. 18,957 | 9/1933 | Gobereau et al. |
|---|---|---|
| 1,333,675 | 3/1920 | Pickett . |
| 1,556,012 | 10/1925 | Flettner . |
| 2,037,528 | 4/1936 | Miller . |
| 2,058,500 | 10/1936 | Plucker . |
| 2,074,149 | 3/1937 | Jacobs . |
| 2,493,895 | 1/1950 | Osterback .............................. 416/23 |
| 2,688,285 | 9/1954 | Stockett, Jr. et al. . |
| 3,213,944 | 10/1965 | Nichols et al. . |
| 4,105,363 | 8/1978 | Loth .................................. 416/23 X |
| 4,111,601 | 9/1978 | Richard . |
| 4,297,076 | 10/1981 | Donham et al. .................. 416/41 X |

FOREIGN PATENT DOCUMENTS

| 361857 | 10/1922 | Fed. Rep. of Germany . |
|---|---|---|
| 990595 | 9/1951 | France . |
| 2401331 | 3/1979 | France . |
| 193827 | 3/1924 | United Kingdom . |
| 730060 | 5/1955 | United Kingdom . |

*Primary Examiner*—Billy J. Wilhite
*Attorney, Agent, or Firm*—Delbert J. Barnard; Eugene O. Heberer; Joan H. Pauly

[57] ABSTRACT

A wind turbine rotor speed control for ensuring a constant rotational speed within tight tolerances includes a self-sufficient rotor (16) incorporating aerodynamic and mechanical devices to provide the control. There is a fixed turbine blade (26) adapted to be mounted on a shaft (14) for rotation therewith, the fixed blade (26) having pivotal blade tips (28) at its respective ends. The pitch control of the blade tips regulates the rotor speed. Aerodynamic tabs (180) are pivotally secured adjacent each of the ends of the respective trailing edges (34, 36) of the fixed blade. The relative wind acts on each tab which is connected to a series of links (188–168) and pitch cams (86) to regulate the pitch of the blade tips from a feathered position (210), to a cut-in position (212), to a rated wind position, and vice-versa. There are torque cams (60) actuated by torsional strain on the shaft bearing which is connected to the shaft (14) and to the pitch cams (86) by a series of links (52, 54) so that as the wind approaches its rated velocity value the pitch cams (86) become ineffective (228) and the torque cams (60) take over the speed control. There are also overspeed centrifugal devices (80) connected to the pitch cams (86) to cause the blade tips (28) to feather in emergency overspeed conditions so as to stop the rotor (16).

20 Claims, 7 Drawing Figures

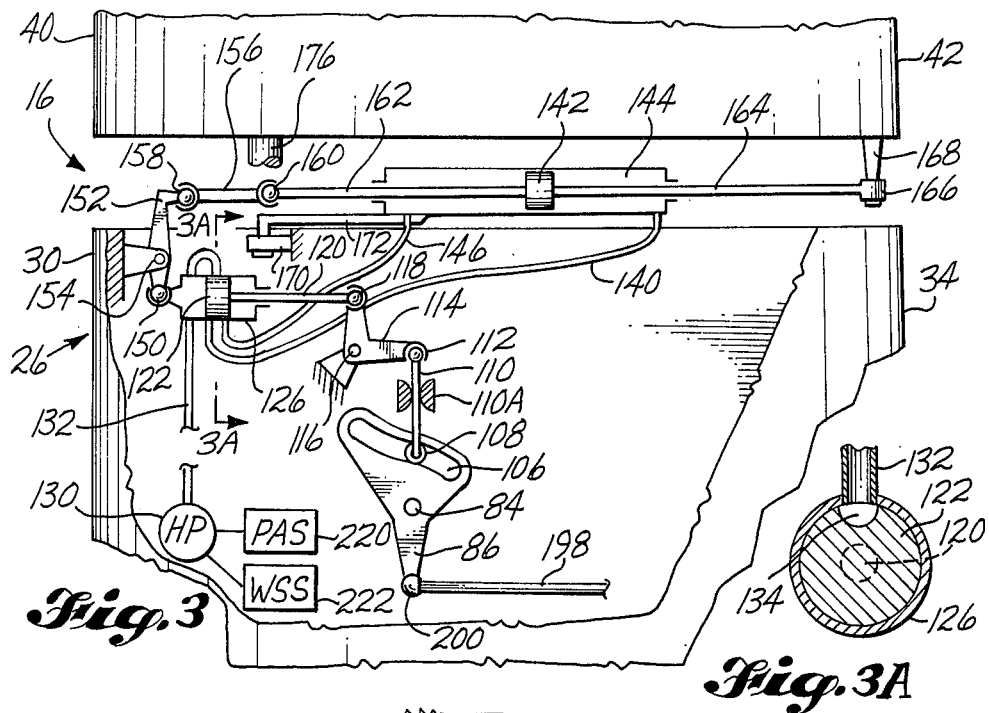
*Fig.3*
*Fig.3A*
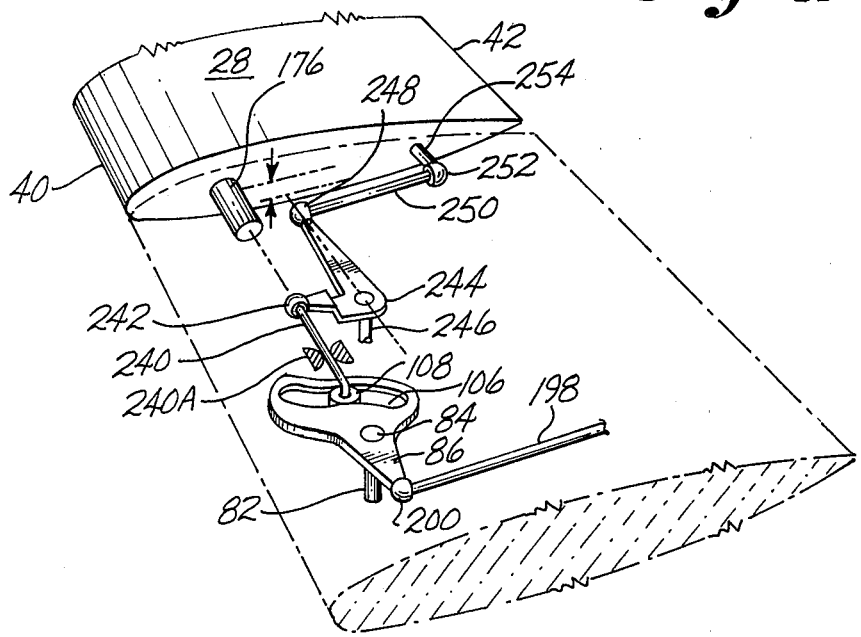
*Fig.6*

WIND TURBINE ROTOR SPEED CONTROL SYSTEM

DESCRIPTION

1. Technical Field

The invention relates to a wind turbine speed control system including aerodynamic and mechanical devices to ensure a tight control of the rotor speed.

2. Background Art

To ensure a constant rotational speed in modern wind turbines within tight tolerances presently requires a complex system of electronics, including computers to provide proper inputs from wind sensors into electrical or hydraulic controls. The cost of the electronic equipment is great and while it may be justifiable in large turbines driving large generators, the cost is not significantly reduced for use in a smaller wind turbine driving a synchronous generator producing 500 Kilowatts or less, for example.

The previous nonelectronic control systems used have either relied on centrifugal or aerodynamic devices without combining them and consequently provided only a coarse control of rotor speed. The increasing costs of energy have provided a need for improved rotor speed control for relatively small windmill rotors that are adapted to drive synchronous generators, for example.

A search of the patent literature discloses a number of systems which propose solutions to this problem. For example, German Pat. No. 361,857 illustrates a turbine in which the speed is controlled by a simple overspeed governor.

British Patent Specification No. 730,060 describes a mechanical means for starting wind power plants at low wind velocities in which the wind turbine blades are provided with adjustable vanes. The vanes are adjusted to limit their performance by means of a centrifugal governor. French Pat. No. 990,595 shows the use of aerodynamic vane regulating devices which in their operation rotate a gear in order to control the rotation of a blade.

The following patents disclose systems similar to those described above:

| U.S. Pat. No. 2,074,149 | Jacobs |
| U.S. Pat. No. 2,058,500 | Plucker |
| U.S. Pat. No. 2,037,528 | Miller |
| U.S. Pat. No. 2,688,285 | Stockett, Jr., et al |
| French Pat. No. 2,401,331 | Schindler, et al |
| U.S. Pat. No. 4,111,601 | Richard |
| U.S. Pat. No. 3,213,944 | Nichols, et al |
| U.S. Pat. No. 1,556,012 | Flettner |
| U.S. Pat. No. 1,333,675 | Pickett |
| U.S. Pat. No. Re. 18,957 | Gobereau et al |
| British Pat. No. 193,827 | Flettner |

DISCLOSURE OF THE INVENTION

The invention is a rotor speed control system for a wind turbine having a fixed turbine blade adapted to be mounted on a shaft for rotation by the wind. At each of the ends of the fixed blade there is a pivotal, tip blade having a pitch axis substantially at right angles to the rotation axis of the fixed blade. An aerodynamic-shaped tab is pivotally secured on the trailing edges of the fixed blade adjacent each of its ends, each tab having the purpose of being always aligned with the relative wind on the fixed blade. The rotor includes the fixed blade, the shaft, and the tip blades.

The tabs are connected to respective linkage means, including cams, which are adapted to pivot the respective tip blades in accordance with the action of the relative wind on the tabs so that the pivoting of the tip blades effects unfeathering of the tip blade at the cut-in wind speed, effects substantially constant blade R.P.M. at the rated wind velocity and at a gradually increasing shaft torque, and maintains proper tip blade pitch schedule.

The tabs also provide a quasi-cyclic pitch input in a yawed position because of the wind angle differential with the blade azimuth. This reduces flapping and unloads the blades. Because of the small tab inertia, the response is practically instantaneous.

The linkage means further provide the required pitch schedule for the blade tips for a wind velocity slightly below the rated velocity to slightly above, and at slightly above the rated velocity pivot the blade tips into feathered positions for stopping the rotor.

The linkage structure is further adapted to feather the blade tips when the wind velocity is reduced to just below the cut-in speed from a higher speed, and includes additional means to feather the blade tips by centrifugal force in the event of a rotor overspeed condition.

In large wind turbine systems in the megawatt range, in order to provide constant rotor speed, a complex system of wind sensors, electronic equipment, and hydraulic actuators is commonly used. Such controls are necessarily expensive and the cost is relatively insensitive to the wind turbine system's size or power output. In small wind turbines below 500 kilowatts, for example, the aforesaid electronic equipment is too expensive and would make the wind turbine system noncompetitive with a power source using fossil fuel.

The aerodynamic tabs and the linkage system of the present invention are inexpensive and are adapted to maintain a substantially constant rotational speed. These devices utilize torque variation in the rotor system due to power load effects, and changes in the relative wind direction due to blade aerodynamics. A centrifugal device is incorporated for safety to provide an overspeed shutdown signal in the case of the development of an uncontrollable runaway situation.

The major advantages of the blade pitch control system, according to the invention, are as follows:

1. All sensing and pitch control devices are contained within the rotor itself.
2. Complex electronics and computers are eliminated, thus reducing cost of smaller units and improving reliability.
3. The aerodynamic shaped tab always senses the relative wind direction and therefore provides pitch angle correction, that is, reduces flapping in a yawed condition so as to alleviate alternating blade loads.
4. For small wind turbines the sensing and controlling system can be purely mechanical, and thus, eliminate the need for hydraulic or electric power sources. Further advantages of the invention may be brought out in the following part of specification wherein small details have been described for the competence of the disclosure, without intending to limit the scope of the invention which is set forth in the appended claims.

BRIEF DESCRIPTION OF THE DRAWINGS

Referring to the accompanying drawings which are for illustrative purposes:

FIG. 3 is a fragmentary plan view of aerodynamic tab pitch control devices of a preferred mode of the invention;

FIG. 3A is a cross-sectional view of a hydraulic valve;

FIG. 6 is a fragmentary view of a preferred mode of the invention for use on relatively small wind turbines.

BEST MODE FOR CARRYING OUT THE INVENTION

Figure 1:
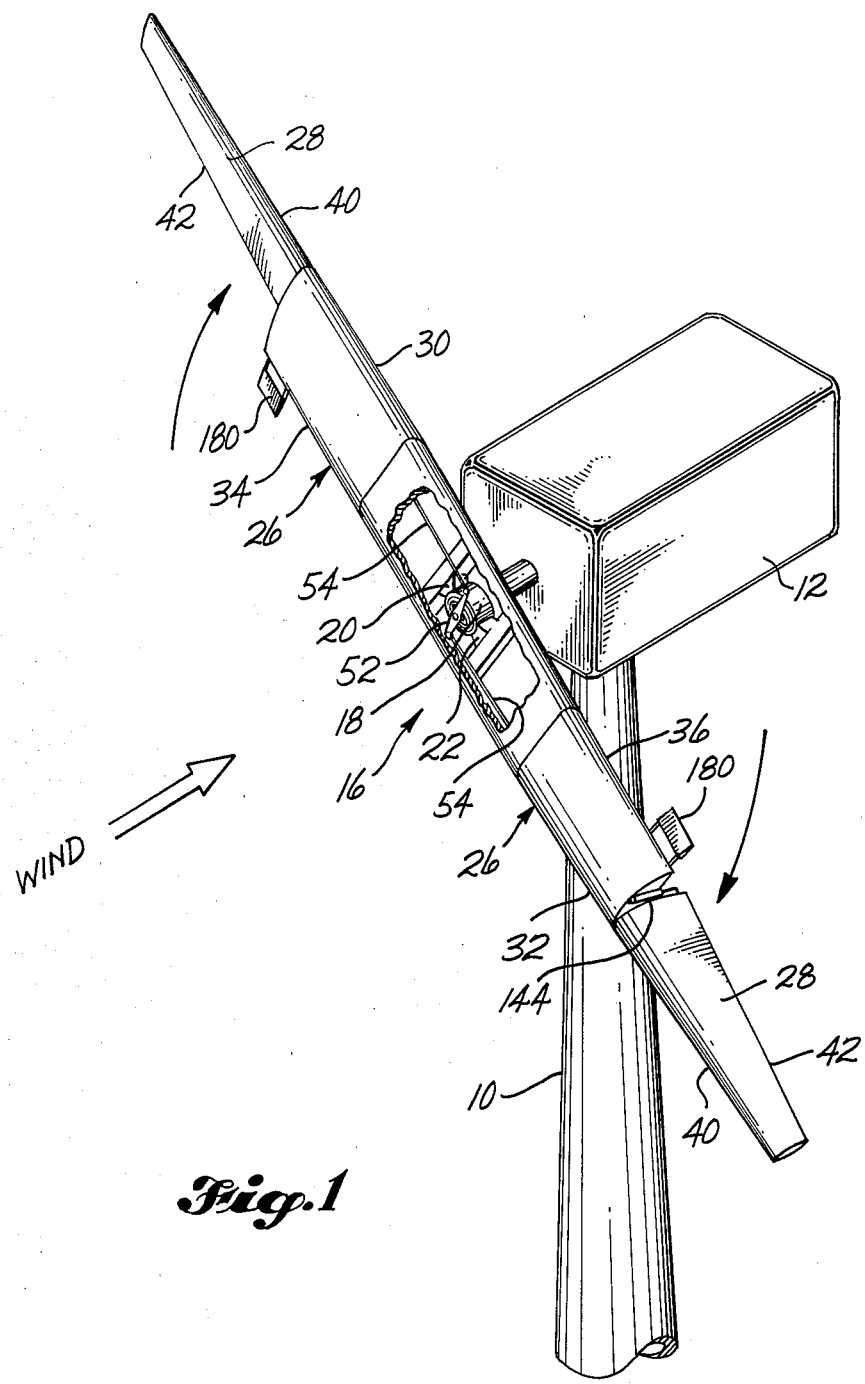
FIG. 1 is a pictorial view of a wind turbine system incorporating the present invention.

Referring again to the drawings, there is shown in FIG. 1 a wind turbine system supported on a tower 10, and bearing mounted for rotation on top of the tower is a nacelle 12 having therein a drive train, not shown, supporting a rotor shaft 14. A wind turbine rotor, generally designated as 16, is mounted to rotate the shaft 14 by means of a elastomeric coupling 18 which in turn is secured in the rotor by mounts 20 and 22, FIG. 2. The rotor is comprised of an inner blade 26, fixed on the shaft 14 so as to drive the same, and two blade tips 28 adapted to rotate with the fixed blade 26 but pivotally mounted on its outer ends to rotate with respect to the fixed blade 26 on axes of the pivotal mountings, substantially perpendicular to the shaft axis.

The fixed blade has an aerodynamic shape, having leading curved edges 30 and 32 in the direction of rotation and opposite trailing edges 34 and 36. The blade tips 28 have the same general configuration as the fixed blade and have surfaces, FIG. 2, adapted to be flush with the fixed blade when aligned therewith for rotation at the rated wind velocity of the rotor. The blade tips diminish in width between leading edges 40 and trailing edges 42 toward their outer ends.

The nacelle 12 rotates on the tower so that the rotor 16 may continually move into the wind by a yaw mechanism (not shown) as indicated by the arrow in FIG. 1. The drive train in the nacelle, connected to the shaft 14, drives a vertical shaft in the tower which in turn typically drives a synchronous electrical generator.

Figure 2:
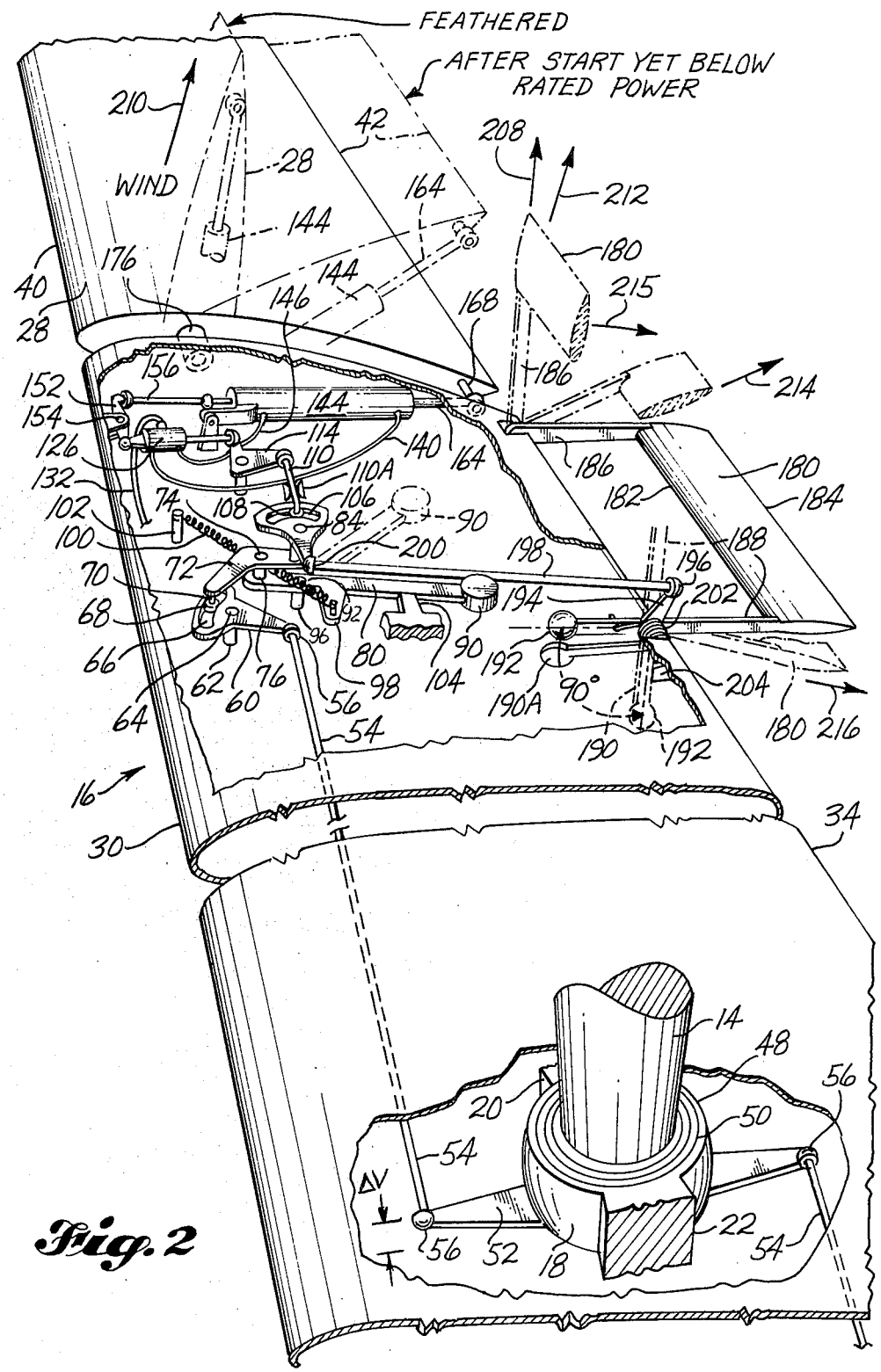
FIG. 2 is a fragmentary view of approximately one-half of a wind turbine rotor, diagramatically illustrating the invention.

In FIG. 2 the elastomeric coupling 18 is preferably generally spherical to allow for teetering of the rotor and shaft, with which the coupling rotates. The coupling is comprised of elastomer layers 48 spaced by metal shims 50. A torque sensing arm 52 is fixed to the end of the shaft 14 and extending from each of the ends of the arm is a rod or link 54, the links extending in opposite directions into each portion of the fixed blade on both sides of the shaft.

The structure or linkage means, shown in FIG. 2, is duplicated on the other end of the rotor, not shown. Each link 54 is pivotally engaged with the arm 52 by means of a ball and socket joint 56. The other end of the link 54 is pivotally engaged at 56 by means of a ball and socket joint to the end of a torque cam 60, mounted on a fixed pin 62 so as to pivot at the end of the pin at 64. A cam surface is formed in a slot 66 and engaged therein is a roller, torque cam follower 68.

The roller follower 68 rotates on a pin 70 as it follows the cam surface, the pin 70 being fixed to one end of a bell crank 72. The crank or link 72 is mounted to pivot at 74 on a pin 76, fixed adjacent one end of a walking beam or link 80. The other end of the crank 72 has a pin 82 fixed thereto and at its upper end 84 the pin 82 pivotally supports a pitch cam 86, whereby the torque arm 52, the torque cam 60 and the pitch cam 86 are linked together.

The walking beam 80 is a centrifugal force overspeed shut-off device and has at its second end a weight 90. The overspeed beam device 80 is mounted to pivot at 92 on a fixed pin 94. The beam 80 has a protrusion 98 extending therefrom between the pivot pin 94 and the weight 90 and in the direction inwardly away from the linking connection of the beam 80 at 76 with the two cams. A coil spring 100 has one end secured adjacent an end portion of the protrusion 80 and has its other end secured to a fixed pin 102. The spring is positioned so that it extends between the pin 76 and the pin 94 so as to normally hold the beam 80 against a fixed stop 104.

Figure 4:
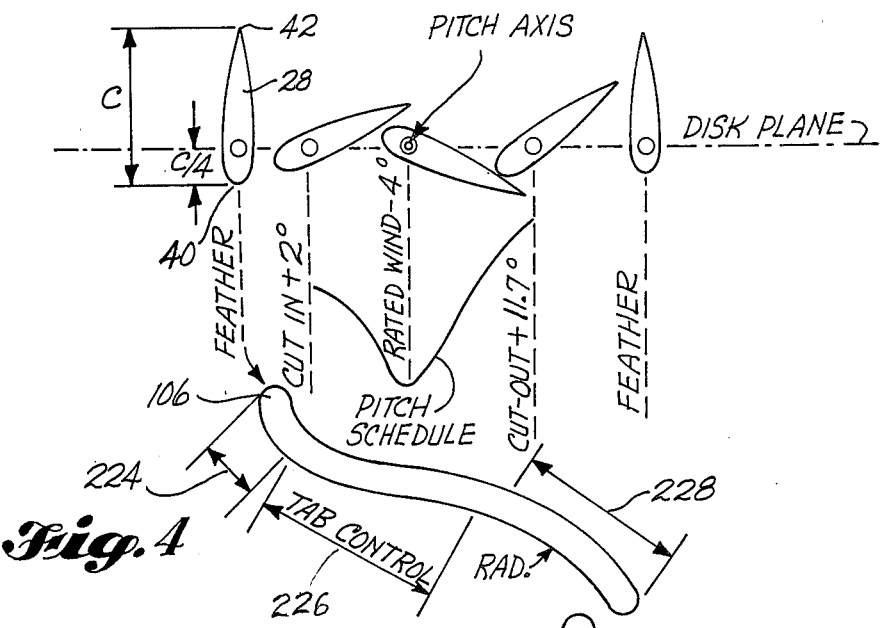
FIG. 4 is a diagrammatic view illustrating the correlation of the blade pitch positions with respect to controlling cam shapes.

The pitch cam surface is formed in a slot 106, FIGS. 3 and 4, and engaged therein is a pitch cam roller follower 108. The roller 108 rotates in the slot as it moved along the cam surface and is supported by one end of a link 110, slidable in a spherically shaped guide sleeve 110A. The other end of the link 110 is pivotally secured by a ball joint 112 to a bell crank 114. The crank 114 is supported on a fixed pin 116 and the other end of the bell crank is connected by a ball and socket joint 118 to a linking rod 120 which operates a sliding hydraulic piston valve 122, FIGS. 3 and 3A.

The valve 122 is within a closed housing 126, connected to a hydraulic source such as a pump 130 by means of a flexible tubular line 132. The pump can be driven by the rotor and can be positioned adjacent the shaft or in the rotor hub. The valve 122 has a groove 134 along its entire upper surface, open to the hydraulic source line 132. Thus, when the valve is moved by link 120 to the right, it permits a flow of hydraulic fluid through the housing to flexible hydraulic line 140 to one side of hydraulic actuator piston 142 in an actuator 144. When the link moves the valve to the left, the hydraulic fluid flows into flexible line 146 to the other side of the actuator piston 142 to move it to the right. The left end of the valve housing 126 is pivotally supported in a ball and socket joint at 150 in one end of a linking walking beam 152, pivotally supported on a fixed member at 154.

The upper end of the walking beam 152 is linked to an inter-link 156 having sockets at both ends to receive the balls 158 and 160 so as to connect the beam 152 with an actuator rod 162 connected to the piston 142. The other end of the piston is connected to piston rod 164, pivotally engaged at its outer end 166 to a pin 168 extending from the tip blade 28. The actuator 144 is pivotally mounted on a fixed member 170 within the fixed blade 26 by means of a link 172 which supports the actuator for rotation between the tip and fixed blades.

Each of the blade tips 28 is mounted on the respective ends of the fixed blade by means of a shaft 176, not shown in detail. The blade tips are adapted to rotate on the axes of the shafts 176 by the action of the actuators 144.

As shown in FIGS. 1 and 2, an aerodynamic-shaped tab 180 is pivotally secured adjacent each of the respective ends of the fixed blade 26 along its trailing edges. Each tab has its vane-shaped leading edge 182 adjacent the trailing edge of the blade and has its trailing edge 184 remote from the blade. The tab is supported by two parallel links 186 and 188 on a pivot axis just inwardly of and generally parallel to the trailing edge of the fixed blade. The link 188 has an extension 190 which is weighted at 192 to mass balance the tab about the pivot to eliminate gravity effects. The link 190 pivots about 90 degrees through slot 190A.

In FIG. 2 the tab 180 in full lines is in the rated wind position and has a protruding arm 194 extending upwardly therefrom, in that position. At its upper end 196 there is a ball and socket joint by which a link 198 is pivotally connected, the other end of link 198 being similarly pivotally connected to the end 200 of the pitch cam 86. A spring 202 is wound around the pivot axis of the link 188 and extends to exert its bias against the link portion 190 to normally tend to hold the link portion against a fixed stop 204.

The position of the tab 180, shown in broken lines in the direction of the arrow 208 is in the feathered position, as is the direction of the blade 28 in broken lines where the wind is in the direction of the arrow 210. The arrow 212 is in the approximate cut-in position for the tab and tip blade, and the arrow 214 indicates an intermediate position of the tab. The tab 180, shown in broken lines, in the direction of the arrow 216 is in the cut-out wind position.

As shown in FIG. 3, there is a pitch angle sensor 220 which shuts off the hydraulic pump when the tab moves from the cut-out position to the feathered position, and when the rotor again slows down after the wind has decreased or when the torque has decreased, a wind speed sensor 222 switches on the hydraulic system. When the hydraulic pump is driven by the rotor, the system shuts off when the rotor stops without the sensors, and similarly, starts when the rotor starts.

AERODYNAMIC TAB CONTROL

In operation, the trailing edge tabs 180 are adapted to always be aligned with the relative wind and operate the valve of actuator 144, for example, by suitable mechanical linkages, as shown, or by electric devices, such as potentiometers, not shown.

Figure 5:
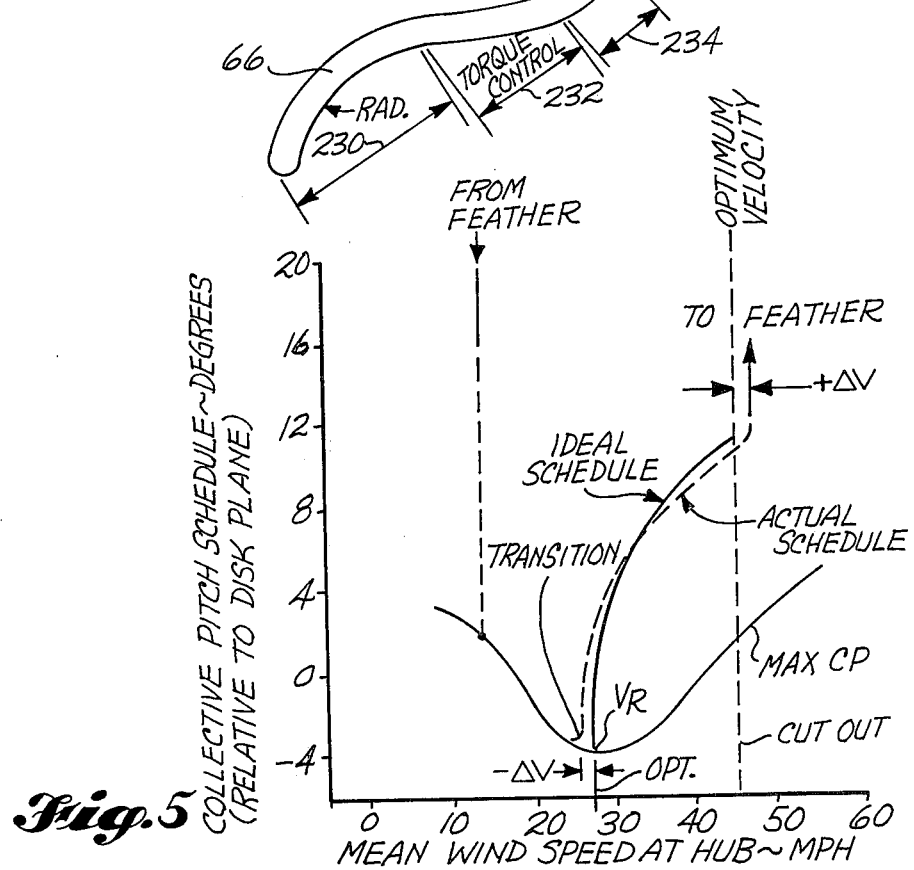
FIG. 5 is a graph illustrating the pitch schedules of the blade tips as a function of wind velocity.

As shown in FIGS. 1-4, the tabs 180 move according to the relative wind on the rotor so that by means of links 188, 194, 198, the pitch cam 86, and the actuator, the rotor is started from the non-operating position where the tip blades 28 and the tabs are feathered in the direction of the arrows 208 and 210, FIG. 2, and FIGS. 4 and 5, on the left side, the arrow 212 being the cut-in position. In FIG. 4 the approximate actual shapes and principles of the pitch cam slot 106 and the torque cam slot 66 are shown in correlation with the tip blade positions. The disk plane is an imaginary plane swept by the 0.25 chord line C. Thus, the cam follower 108 is in the portion of the cam indicated between the arrows 224 when the linkage causes the pitch cam to move the follower from that portion of the slot to the cut-in position, FIGS. 2 and 3.

In order to start the unfeathering of the tip blade at the cut-in wind speed, tab 180 is biased by the spring 202, FIG. 2, against the stop 204. This generates lift on the tab in the positions between the arrows 208 and 212, the lift being in the direction of the arrow 218. This moves the tab clockwise to start to open the valve 122 to permit flow through the line 140. The linking of the valve body 126 to the actuator piston rod 162 by the walking beam 152 and the link 156, FIG. 3, minimizes the motion of the valve 122, which covers the orifices to both flexible lines 140 and 146 when the cam is not moving. The usual valve motion is only about 0.020 inch.

According to the pitch schedules as shown in FIGS. 4 and 5, the tip blade pitch is accurately programmed by the pitch cam in the wind range shown in FIG. 5, that is, between about 15 and 45 miles per hour so as to ensure a constant R.P.M. at a gradually increasing rotor torque, for example, as indicated by the output of a synchronous generator driven by the rotor. Because the cam surface 106 cannot have abrupt discontinuities, a transition motion occurs, as shown in FIG. 5.

As the rotor accelerates to the full R.P.M. within the wind range, the relative wind shifts clockwise and the tabs and tip blades follow. When a synchronous generator, for example, cuts in and the power increases to slightly below its rated power, the tabs controlled pitch cams ensure the proper pitch schedule, as indicated in FIGS. 4 and 5. Thus, the cam 106 has moved in this situation within the arrows indicated as 226; that is, the position of the cam is then such to have moved the follower to between the cut-in and cut-out positions.

TORQUE INDUCED PITCH CONTROL

When the wind approaches its rated velocity value, the cam moves so that the follower is moved into the area indicated by the arrows 228 in FIG. 4, that portion of the cam being on a radius so as to be ineffective with respect to blade pitch control. The space between the arrows 228 in cam 106 does not apply to the cut-out and feathering on the right side of the portion of FIG. 4 above the cams. When the cam follower 108 is in the area between the arrows 228, the torque strain differential becomes effective through the torque cam 60 and its slot surface 66.

As shown in FIG. 2, the angular travel of the arm 52 is indicated by the distance between the arrows as $\Delta V$. The angular travel is caused by the differential strain between the $V_{rated} - \Delta V$, and $V_{rated} + \Delta V$ wind velocity torque. This causes the arm 52 to rotate and to move the links 54 to pivot the cam slot 66 to change positions of the follower and thus pivot the link 72 which in turn rotates the pin 82 so as to change the position of the cam slot 106 and the follower 108.

The shape of the cam slot 66 between the arrows 230 is that of a radius so as to be ineffective with respect to the follower 68 and the links connected thereto. Between the cut-in and rated wind velocity, as shown on the left part of the area between the arrows 232 in FIG. 4, the schedule of the torque cam 66 does not affect the valve 122 through the linkage 54 and that connected between the two cams and the valve. The displacement $\Delta V$ of the arm 52, FIG. 2, moves the roller 68 within the arrows 232. Only after the rotor torque approaches the rated value, for example, about 98% of the rated generator output, does the cam slot 66 start to move the bell crank 72 and thus displace the pitch cam fulcrum 82 which results in the movement of the cam 86 and the bell crank 114 to act on the valve 122 and change the position of the actuators and the tip blades. The torque cam is programmed to provide the required pitch schedule from a wind velocity slightly below the rated velocity to slightly above rated as indicated in FIGS. 4 and 5. This means that a generator output will vary in the same way and within its operating tolerances. The increasing torque, from the $V_R$ (rated velocity)$-\Delta V$ to $V_R+\Delta V$, increases the torque strain to move both cams and the actuator valve 122 to change the blade pitch. At $V_R+\Delta V$, the high-sloped torque cam slot 66 moves the actuator valve, the tab and the tip blade rapidly into the feather position and the rotor is shut down by the pitch angle sensor 220. It should be noted that when the torque cam follower 68 moves into the area indicated as 234 between the arrows in FIG. 4, the pitch cam would be ineffective in that its follower 108 is in the area indicated by the arrows 228 which is on a radius with respect to the pivot at 84. Thus, the torque cam controls the blade pitch.

HIGH WIND CUT-OUT AND CUT-IN

As indicated in the foregoing as the rotor comes to a stop in high winds, the tabs gradually follow the relative wind to move the pitch cam 86 back into starting position where the follower 108 is between the arrows 224 in the cam slot 106, FIG. 4. At the same time, the decreasing rotor torque moves the cam 60 into a zero torque position where the follower 68 is at the right end of the cam slot between the arrows 234 and the tip blades have feathered as indicated in FIG. 4, prior to bringing the rotor to a complete stop. When the wind speed has been reduced to slightly below the cut-out limit, the rotor is then ready to restart but because the hydraulic system has been shut off by the pitch angle sensor or the rotor, the position of the hydraulic valve 122 has no effect. However, the position of the tabs will be such as to open the actuator valve 122 to unfeather the blade tips to produce torque and power valve through the generator, should the wind velocity exceed the cut-in value.

LOW WIND CUT-OUT

During operation when the wind velocity starts to slow to approach the cut-in speed from a higher value, and because at this time the torque cam 60 is ineffective, the tab gradually moves toward the starting position with the aid of the spring 202, FIG. 2. This spring is calibrated to force the tab against the stop 204 just below the cut-in wind speed and thus move the tip blade into a feathering position to effect the stopping of the rotor.

EMERGENCY-OVERSPEED SHUTDOWN

During normal operation in the event of generator power loss, the rotor would accelerate. The torque would drop to almost zero, there being only inertia and friction to overcome. The torque cam 60 then moves so that the roller is on the radius of the slot between the arrows 230 where it is ineffective. At the same time the tab 180 would start moving beyond the cut-out angle 216, FIG. 2, where it would be ineffective to control the actuator valve 122, the roller 68 being in the radius area indicated by the arrows 228 in FIG. 4.

In this situation an emergency overspeed shutdown device is required and is provided in the form of the centrifugal force device in the walking beam 80 and weight 90, FIG. 2, which functions to provide tip blade emergency feathering. Thus, when the rotor overspeeds, the spring 100, extending between the pin 102 and the protrusion 98 on the walking beam, overcomes the weight moment about the pivot 94 in the fixed blade part in the upper rotational position. Because of the overcenter arrangement of the spring 100 with respect to the pivot 98, the spring assists the weight motion away from the stop 104 when the increasing centrifugal force starts to move the weight 90 toward the broken line position. As soon as the longitudinal axis of the spring 100 moves over the center, that is, over the pivot 92, the walking beam is moved to the broken line position.

When this occurs the walking beam rotates the fulcrum 76 and the cam 86 is pivoted by the downwardly or inwardly movement of the bell crank pivot 74 so that the follower 108 is moved in the cam slot 106 between the arrows 224, in FIG. 4, to move the valve 122 to the right, FIG. 3, to cause the actuator 144 to move the tip blade into a feathering position.

During this operation there will be a discrepancy in centrifugal forces acting on the weights 90 between the upper and lower parts of the fixed blade. In an extreme case the delay in feathering of the upper blade may amount to one half of a revolution but such a delay can be tolerated by the structure. It should be noted that the weight-spring system moment about the pivot 94 should be higher than any moment resulting from shear loads at the fulcrum 76.

Instead of the mechanical centrifugal system in the form of the mechanical linkage shown, a single centrifugal governor could be used for providing a signal to an actuator in both parts of the fixed blade which would then move the fulcrum 76 in the desired direction. Such a system would then ensure a true simultaneous feathering of both tip blades.

Because the actuation of the centrifugal device including the weight 90 is an emergency situation requiring inspection or repair of certain components, the repositioning of the walking beam 80 can be accomplished manually.

ALTERNATE PREFERRED MODE

As indicated, the tip blade pitch control systems described, basically are a combination of mechanical sensing devices controlling the blade pitch by means of hydraulic actuators. In smaller units the hydraulic system could be eliminated and the tip blade pitches could be controlled directly by tabs 180 and torque strain via the mechanical linkages described above. In FIG. 6 such a preferred mode system is shown. Here, the pitch cam 86, shown, and the torque cam 60 with connecting linkages, as the walking beams 80, the links 54, and the arm 52 are also included, but not shown.

In FIG. 6, the cam follower 108 is pivotally connected to a link 240 at one end and which has its other end pivotally connected in a ball and socket 242 to one end of a bell crank 244, the link 240 being stabilized by a spherically shaped quide sleeve 240A. The bell crank is supported on a fixed pivot 246 and has on its other end a ball and socket pivot 248 connected to a link 250. The link 250 is connected by a ball and socket 252 to a link 254 which by the movement of the cams, as described above, would rotate the tip blades 28 on the pivot axes 176 in the same manner as the actuators 144 moves the tip blades 28.

In both preferred modes, the mixing linkages disclosed above, especially the cams, could be replaced by electro-mechanical devices providing the pitch signal inputs. That is, the cams could be replaced by linking potentiometers for controlling the motion of the valve 122. However, regardless of the final design configuration, the blade tip pitch control signals originate from the aerodynamic tabs 180, the rotor shaft or mount torque strain, and from a centrifugal emergency device.

The rotor in all situations, according to the invention, incorporates all of the sensing devices and actuators and may require only power supply, electrical or hydraulic, from the exterior thereof.

The hydraulic system could consist of a known combination of a hydraulic accumulator under compressed gas pressure for the starting mode and a rotor driven pump for the operational mode.

An electric system in turn could consist of a known combination of battery and rotor driven separate utility generator. Electric power during operation could be also tapped from the large generator, thus obviating the separate utility unit.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims.

I claim:

1. A wind turbine rotor speed control system, comprising:
    a fixed turbine blade adapted to be mounted on a shaft for rotation by the wind;
    a pivotal blade tip mounted on each of the respective ends of the fixed blade, said blade tips being mounted on pitch axes substantially at right angles to the rotation axis of the fixed blade;
    said fixed blade having trailing edges in opposite directions on opposite sides of the rotation axis;
    a tab pivotally secured to and to trail from each of said respective trailing edges of said fixed blade;
    each tab being adapted to be aligned with the relative wind on the fixed blade;
    each tab being connected to a respective blade tip by linkage means;
    each linkage means being adapted to pivot the respective blade tip in accordance with the action of the relative wind on the tab;
    said pivoting of the blade tip effecting reduction of flapping and unloading of the tip blade, effecting unfeathering of the blade tip at the cut-in wind speed, effecting substantially constant blade R.P.M. from the cut-in to the rated wind velocity and at a gradually increasing shaft torque, and maintaining proper tip blade pitch schedule.

2. The invention according to claim 1 in which:
    each linkage means further includes means to provide a required pitch schedule for the blade tip from a wind velocity slightly below the rated velocity to slightly above the cut-out wind velocity, when the last means pivots the blade tip into a feathered position for stopping the rotor rotation.

3. The invention according to claim 2 in which:
    said linkage means is further adapted to feather the blade tip when the velocity is reduced to just below the cut-in speed from a higher speed.

4. The invention according to claim 3 including:
    centrifugal force means connected to said linkage means to feather said tip blade in the event of a rotor overspeed, runaway condition.

5. The invention according to claim 1 in which:
    each tab is an aerodynamic-shaped vane having its leading edge proximate to the trailing edge of the fixed blade and having its trailing edge distal from the fixed blade.

6. The invention according to claim 5 in which:
    each tab is secured to said fixed blade by respective arm means pivotally engaged with the fixed blade;
    each linkage means including a first series of links pivotally engaged within said fixed blade and to said arm means;
    a pitch cam pivotally connected to said first series and pivotally supported in said fixed blade;
    a second series of links pivotally engaged within said fixed blade and to said blade tip;
    a pitch cam follower engaged with said cam and pivotally connected to said second series;
    said cam being pivoted with respect to relative wind on said tab by said arm means and said first links;
    said pitch cam being programmed so that as it is pivoted it changes the position of the cam follower to actuate said second series to pivot said blade tip in accordance with relative wind positioning of the tab to feather the blade tip, to unfeather it, to move it to cut-in position, and to move it to the rated wind position.

7. The invention according to claim 6 in which:
    a portion of said arm means extends beyond the tab pivot generally away from the tab generally toward the fixed blade;
    the arm means being weighted beyond the pivot away from the tab to mass balance the tab about the pivot to eliminate gravity effects.

8. The invention according to claim 6 in which:
    each pitch cam is shaped so that when the wind approaches the rated velocity value, the cam contacts the follower where the follower is ineffective to affect the blade tip pitch through the second series links.

9. The invention according to claim 8 in which:
    said fixed blade is mounted for rotation on a shaft by means of a coupling adapted to produce torsional strain during rotation;
    said linkage means further including a control arm centrally fixed to rotate with the shaft and having torque strain sensing links pivotally connected to each of the ends of the control arm, one torque link extending into one part of the fixed blade beyond the shaft and another torque link extending in the opposite direction into the other part of the fixed blade beyond the shaft;
    a torque cam in each part of the fixed blade and being mounted on a fixed pivot;
    each torque link being pivotally connected to a respective torque cam;
    a torque cam follower engaged with each respective torque cam;
    a pivotally mounted cam connecting link having one end supporting a respective torque cam follower and having a supporting pin at its other end to pivotally support a respective pitch cam;
    said torque links being arranged to move relative to torsional strain and said torque cams being shaped so that between the cut-in and rated wind velocities, the torque cam contacts the torque followers so that they do not move the cam connecting links and do not affect the pitch cams;
    said torque links being positioned and the torque cams being shaped so that after the shaft torque approaches the rated value, the torque cams are pivoted, the torque followers are moved, and the cam connecting links are pivoted to pivot the pitch cams to provide the required pitch schedule for the tip blades from a wind velocity slightly below the rated to slightly above the cut-out speed and to vary the shaft output in the same way but within its operating tolerances;

the torque cams being shaped so that, as the torsional strain is increased by rotation in excess of the rated value, the pitch cams are further pivoted to feather the tip blades.

10. The invention according to claim 9 in which:
the cams are slots and the followers are rollers fitted to roll along the slot surfaces.

11. The invention according to claim 10 in which:
said cams slots have three types of surfaces on which the followers roll;

one of said surfaces being an end surface which is a radius with respect to the pivotal support of the cams and which which is generally ineffective with respect to the blade tip pitch;

a second of said surfaces is intermediate and programs the blade tip pitch by the pitch cam from the cut-in to the rated wind velocity and by the torque cam programs the blade tip from the approach to near rated wind to slightly above the cut-out wind velocity; and a third of said surfaces being an opposite end surface which programs the blade tip by the pitch cam from feathered to cut-in pitch angle and vice-versa, and by the torque cam programs the blade tip pitch angle from slightly above the cut-out wind speed to feather and vice-versa.

12. The invention according to claim 9 in which:
said linkage means further includes hydraulic actuators controlled by said respective pitch cams to directly pivot the tip blades.

13. The invention according to claim 12 including:
a hydraulic pump to supply fluid to said actuators;
a pitch angle sensor to shut off the hydraulic pump when the tip blades are feathered by shaft rotation in excess of the rated valve.

14. The invention according to claim 13 including:
a wind speed sensor to start the hydraulic pump when the wind speed is slightly below the over speed cut-out limit.

15. The invention according to claim 9 including centrifugal force controlled devices to provide tip blade emergency feathering to stop shaft overspeed, comprising:

a beam pivotally mounted in said fixed blade on each respective side of said shaft and adjacent said cams;
each beam being mounted on a fixed pin adjacent a proximate end of the beam, each beam being weighted at its distal opposite end so that said distal end tends to rotate toward the outer end of the blade due to centrifugal force;

a spring on each respective side of said shaft having one end secured to a fixed pin on one side of a respective beam and having its other end secured to a protrusion extending from said beam in a direction away from said one end of said spring;

said spring normally being on an axis on the side of the fixed pin on which the beam is mounted adjacent the proximate end so as to bias the beam against a stop on the same side of said beam as said protrusion;

each pivotally mounted cam connecting link being mounted on a respective pin fixed to each beam adjacent its proximate end so that rotation of said beam by centrifugal force on the weighted distal end rotates each cam connecting link to pivot the pitch cams to pivot the blade tips to the feathered positions;

each spring being adapted to be moved over each respective beam supporting pin in an over center movement that assists the weighted end motion away from the respective beam stop as increasing centrifugal force starts to move the weighted beam ends.

16. The invention according to claim 9 in which:
said coupling is generally spherical in cross section having elastomer layers with metal shims therebetween.

17. The invention according to claim 6 in which:
said linkage means includes means associated with the tab to aid in starting unfeathering the blade tip in the feathered position at the cut-in wind speed.

18. The invention according to claim 17 in which:
said last means being a spring biasing said tab toward the feathered position.

19. The invention according to claim 18 in which:
said spring is calibrated to force the tab to move the blade tip into the feathered position just below the cut-in wind speed.

20. The invention according to claim 6 in which:
each tab is positioned adjacent a respective end of said fixed blade and is spaced from said fixed blade by said respective arm means;

said arms means for each tab being a pair of spaced links;

one of said links extends beyond the tab pivot generally away from the tab generally toward the fixed blade;

said last link being weighted beyond the tab pivot away from the tab to mass balance the tab about the pivot to eliminate gravity effects.

* * * * *